(12) United States Patent
Imhof et al.

(10) Patent No.: US 6,213,734 B1
(45) Date of Patent: Apr. 10, 2001

(54) MOTOR FUEL DELIVERY UNIT

(75) Inventors: Ernst Imhof, Kornal-Muenchingen; Klaus Dobler; Michael Huebel, both of Gerlingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/341,356

(22) Filed: Jul. 9, 1999

(30) Foreign Application Priority Data

Nov. 28, 1997 (DE) .............................. 197 52 884

(51) Int. Cl.$^7$ .............................. F04B 17/00; F01B 25/00
(52) U.S. Cl. .................. 417/356; 417/423.1; 417/423.7; 415/10
(58) Field of Search .................. 417/356, 423.1, 417/423.7; 415/55.1, 55.2, 55.3, 55.4, 10

(56) References Cited

U.S. PATENT DOCUMENTS

| | | | |
|---|---|---|---|
| 3,572,982 | * 3/1971 | Kozdon | 417/423.7 |
| 5,601,398 | * 2/1997 | Treiber et al. | 415/55.1 |
| 5,678,306 | * 10/1997 | Bozeman, Jr. | 417/423.1 |
| 5,949,171 | * 9/1999 | Horski et al. | 417/423.1 |

FOREIGN PATENT DOCUMENTS

| | | |
|---|---|---|
| 09131038 | * 5/1997 | (JP) . |
| WO 95/25885 | 9/1995 | (WO) . |

* cited by examiner

Primary Examiner—Timothy S. Thorpe
Assistant Examiner—Michael K. Gray
(74) Attorney, Agent, or Firm—Michael J. Striker

(57) ABSTRACT

The motor fuel delivery unit for delivering motor fuel includes a delivery pump (11) and an electric motor (12) for driving the delivery pump (11). The delivery pump (11) includes a housing (13) provided with a pump chamber (14) and an impeller wheel (16) arranged in the pump chamber (14). The electric motor (12) includes a stator (28) provided with an armature winding (32) and a rotor (29) provided with permanent magnets (30). The electric motor (12) is brushless and consists of the impeller wheel (16) of the delivery pump (11). The stator (28) has an inner ring face consisting of a peripheral wall (143) of the pump chamber (14).

16 Claims, 7 Drawing Sheets

MOTOR FUEL DELIVERY UNIT

BACKGROUND OF THE INVENTION

1. Field of the Invention

The invention relates to a delivery unit for motor fuel of the species defined in the preamble of claim 1.

The present invention relates to motor fuel delivery unit for delivering motor fuel and, more particularly, to a motor fuel delivery unit comprising a delivery pump having a housing provided with a pump chamber and an impeller wheel arranged in the pump chamber and an electric motor for driving the delivery pump. The electric motor comprises a stator, a rotor, an armature winding and permanent magnets.

2. Prior Art

With a known delivery unit of this type for delivering motor fuel from a motor fuel reservoir to an internal combustion engine of a motor vehicle (WO 95/25885), the delivery pump and the electric motor for driving it are arranged next to each other in a housing. The impeller wheel, which is equipped with vanes or blades arranged around its periphery, is attached to the shaft of the rotor. The rotor has an armature winding arranged in grooves provided in it for the armature winding. The stator is equipped with permanent magnet segments. The current supply to the armature winding is provided by a commutator or reversing switch seated on the rotor shaft and two current brushes resting radially under spring pressure on the commutator.

SUMMARY OF THE INVENTION

It is an object of the present invention to provide an improved fuel delivery unit for motor fuel of the above-described kind, which is simpler and more compact.

This object and others, which will be made more apparent hereinafter, are attained in a motor fuel delivery unit for delivering motor fuel comprising a delivery pump and an electric motor for driving the delivery pump. The delivery pump has a housing provided with a pump chamber and an impeller wheel arranged in the pump chamber. The electric motor comprises a stator, a rotor, an armature winding and permanent magnets. The stator receives either the armature winding or the permanent magnets. The permanent magnets are arranged on or included in the rotor when the armature winding is received by the stator or the armature winding is arranged on the rotor when the stator receives the permanent magnets.

According to the invention the electric motor is brushless and consists of the impeller wheel of the delivery pump. The stator has an inner ring face consisting of a peripheral wall of the pump chamber. This peripheral wall of the pump chamber bounds the impeller wheel radially and is radially spaced from it.

The delivery unit for motor fuel in accordance with the invention has the advantage that a very simple and compact construction, which can be provided with small production outlay, is achieved by combining the rotating elements of the delivery unit, i.e. the impeller wheel of the delivery pump and the rotor of the electric motor, into a single element. It is in particular possible to embody the delivery unit very flat, i.e. with extremely small axial dimensions. The exterior diameter of the delivery unit which increases in this case, together with the conventional embodiment of the delivery unit, does not represent a disadvantage, but opens the possibility for additional steps for improving the efficiency of the delivery unit. Because the commutator and the current brushes are omitted, wear of the brushes no longer occurs, so that the service life of the delivery unit is increased. When the electric motor is designed as a DC-motor, the required commutation of the current in the stator winding is performed electronically.

In accordance with a preferred embodiment of the invention, the cylinder-shaped pump chamber is delimited by two radially extending lateral walls, which are axially spaced apart, and a peripheral wall, which connects the two lateral walls with each other along their circular periphery. The impeller wheel is placed with clearance in respect to the lateral walls, and the interior surface of the stator formed by riveted armature stampings constitutes the peripheral wall of the pump chamber. The impeller wheel has a plurality of radial impeller wheel vanes, which are spaced apart from each other in the circumferential direction, delimit axially open vane chambers between each other and are connected with each other by means of an outer ring. The permanent magnets are fastened on the outer ring, and if the the delivery unit is made of plastic, they are preferably made of plasto-ferrite materials.

In accordance with an advantageous embodiment of the invention, a groove-like side channel, which is open toward the pump chamber, is formed in each lateral wall of the pump chamber concentrically in relation to the impeller wheel axis, and has an interrupter strip remaining between the side channel end and the side channel start in respect to the flow direction. The side channel start of at least one side channel is in connection with an intake opening, and the side channel end is in connection with a pressure outlet, wherein the axes of the inflow and outflow channels form the intake opening and are either axially or preferably radially oriented in relation to the pressure outlet. A considerable reduction of the flow losses is achieved by the particularly advantageous inflow and outflow of the motor fuel into, or respectively out of the pump chamber, and the efficiency of the pump is improved by this. In contrast to conventional side channel pumps, the radial inflow and outflow becomes possible without problems because of the increased exterior diameter of the delivery unit based on the structure in accordance with the invention, since in this way sufficient structural space is provided in the radial direction for housing appropriate inflow and outflow channels.

BRIEF DESCRIPTION OF THE DRAWING

The objects, features and advantages of the invention will now be illustrated in more detail with the aid of the following description of the preferred embodiments, with reference to the accompanying FIGS. in which.

Figure 1:
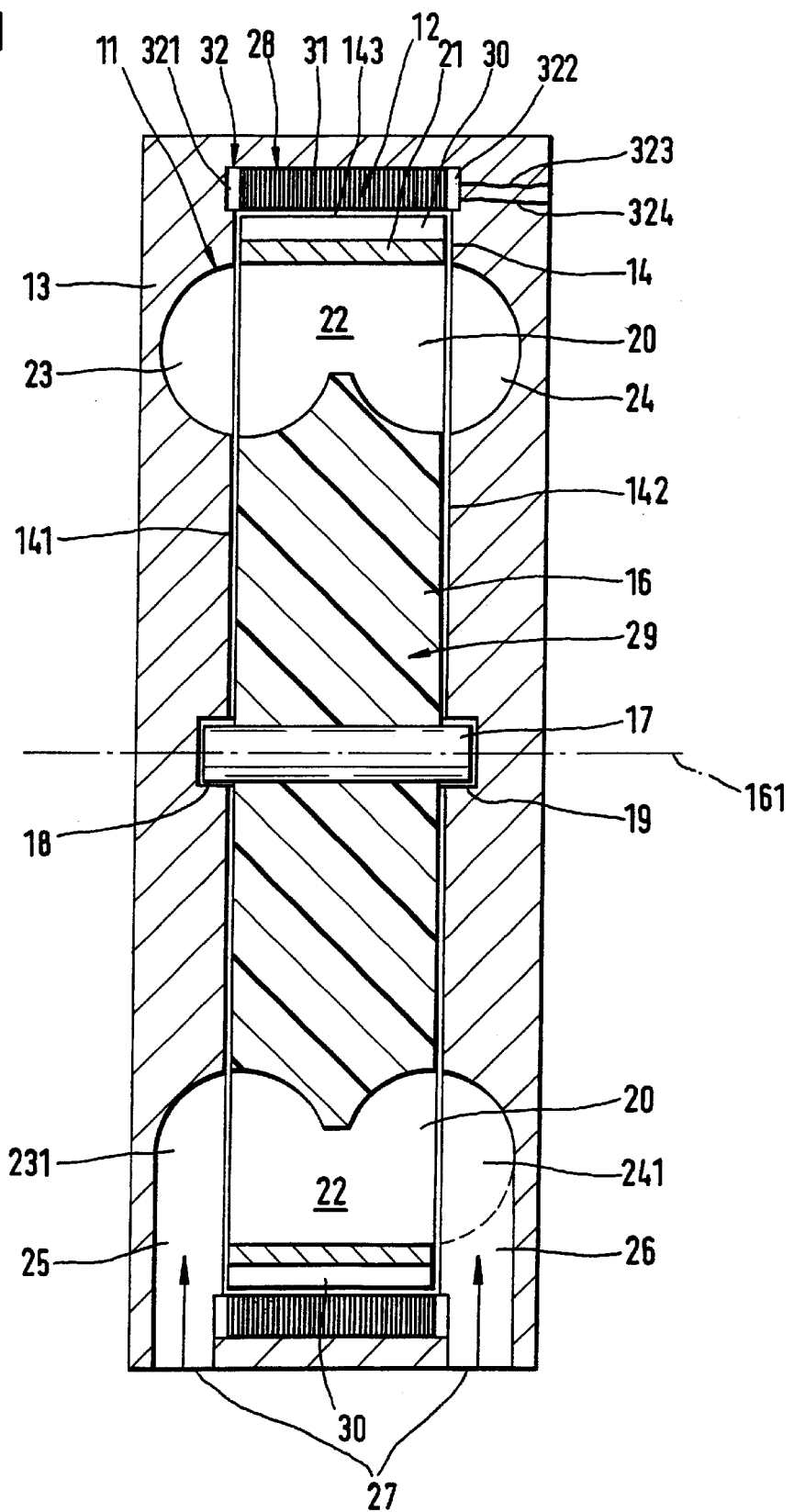
FIG. 1 is a longitudinal cross-sectional view through a first embodiment of a fuel delivery unit according to the invention, wherein the upper half of the section is through a flow area and the lower half is through the intake area of the delivery unit.

The delivery unit schematically represented in FIG. 1 is used for delivering motor fuel from a reservoir to the internal combustion engine of a motor vehicle. Usually the delivery unit is arranged together with a filter cup in the motor fuel container or motor fuel tank of the motor vehicle as a so-called built-in tank unit. The delivery unit has a delivery pump 11, designed as a flow or side-channel pump, and an electric motor 12 driving the delivery pump 11. The delivery pump 11 and the electric motor 12 are received in a common housing 13. The design and function of the delivery pump 11 are known and described, for example, in DE 40 20 521 A1. A pump chamber 14 is formed in the housing 13, which is delimited in the axial direction by two radially extending lateral walls 141, 142, which are axially spaced apart from each other, and in the circumferential direction by a peripheral wall 143, which connects the two lateral walls 141, 142 along their circular periphery. A pump or impeller wheel 16 is arranged in the pump chamber 14, which is seated, fixed against relative rotation, on a shaft 17. The two shaft ends of the shaft 17 are received in two bearings 18, 19, which have been formed in the two lateral walls 141, 142. The axis of the shaft 17 is co-linear with the axis 161 of the impeller wheel and the axis of the pump chamber 14. The impeller wheel 16 has a plurality of radial impeller wheel vanes 20, which are spaced apart from each other in the circumferential direction, only two of which can be seen in the drawings. The impeller wheel vanes 20 are connected with each other by an outer ring 21. Respectively two impeller wheel vanes 20 delimit a vane chamber 22 between each other, which is axially open. The impeller wheel 16 is placed with clearance in respect to the lateral walls 141, 142, and the outer ring 21 encloses a radial gap, together with the periphery wall 143 of the pump chamber 14. A groove-like side channel 23, or respectively 24, is formed in each lateral wall 141, 142 of the pump chamber 14 and is open toward the pump chamber 14, is arranged concentrically in respect to the impeller wheel axis 161, and in the circumferential direction extends over almost 330° from a side-channel start to a side-channel end, wherein an interrupter strip remains between the side-channel end and the side-channel start. Only the side-channel start 231 and 241 of the side channel 23 and 24 can be seen in the lower sectional view. The side-channel end is arranged offset by a circumferential angle of approximately 330° in respect to this. Each side channel 23, 24 is connected via a radially oriented inflow channel 25, or respectively 26, with an intake opening 27 of the delivery unit. The side-channel openings, which are not visible here, of the two side channels 23, 24 are connected via respectively one outflow channel with a delivery pipe tube of the delivery unit. In an alternative embodiment of the invention only the side-channel start 231 of the side channel 23 is connected with an inflow channel 25, and only the side-channel end of the side channel 24 with an outflow channel. In this case the inflow channel 23 on the right side of the sectional representation is omitted, and in this area the side channel 24 has a cross section as indicated by dashed lines in the drawing. Moreover, the inflow channel 25, 26 can be axially arranged, but the radial arrangement has the advantage of reduced flow losses and can be easily realized because of the comparatively large exterior diameter of the delivery unit.

In the known manner, the electric motor 12, which is embodied with so-called internal pole rotors, has a stator 28 and a rotor 29 which, to achieve an extremely flat construction of the delivery unit, is integrated into the impeller wheel 16 of the delivery pump 11. Its magnetic poles are formed by the permanent magnet segments 30, which are fastened on the outer ring 21 of the impeller wheel 16. The stator 28 in the form of riveted armature stampings 31 is arranged in the housing 13 coaxially in respect to the impeller wheel axis 161 in such a way that the inner ring face of the armature stampings 31 constitute the peripheral wall 143 of the pump chamber 14. An armature winding 32 is arranged in the usual manner in the grooves of the armature stampings 31, of which only the two front end turns 321 and 32 and the two connecting lines 323 and 324 can be seen in the schematic representation. In case of a DC operation, the electric motor is electronically commutated.

If the impeller wheel 16 of the delivery pump 11 is made of plastic, a production advantage results if the permanent magnetic segments 30 are made of plasto-ferrite materials.

Figure 2:
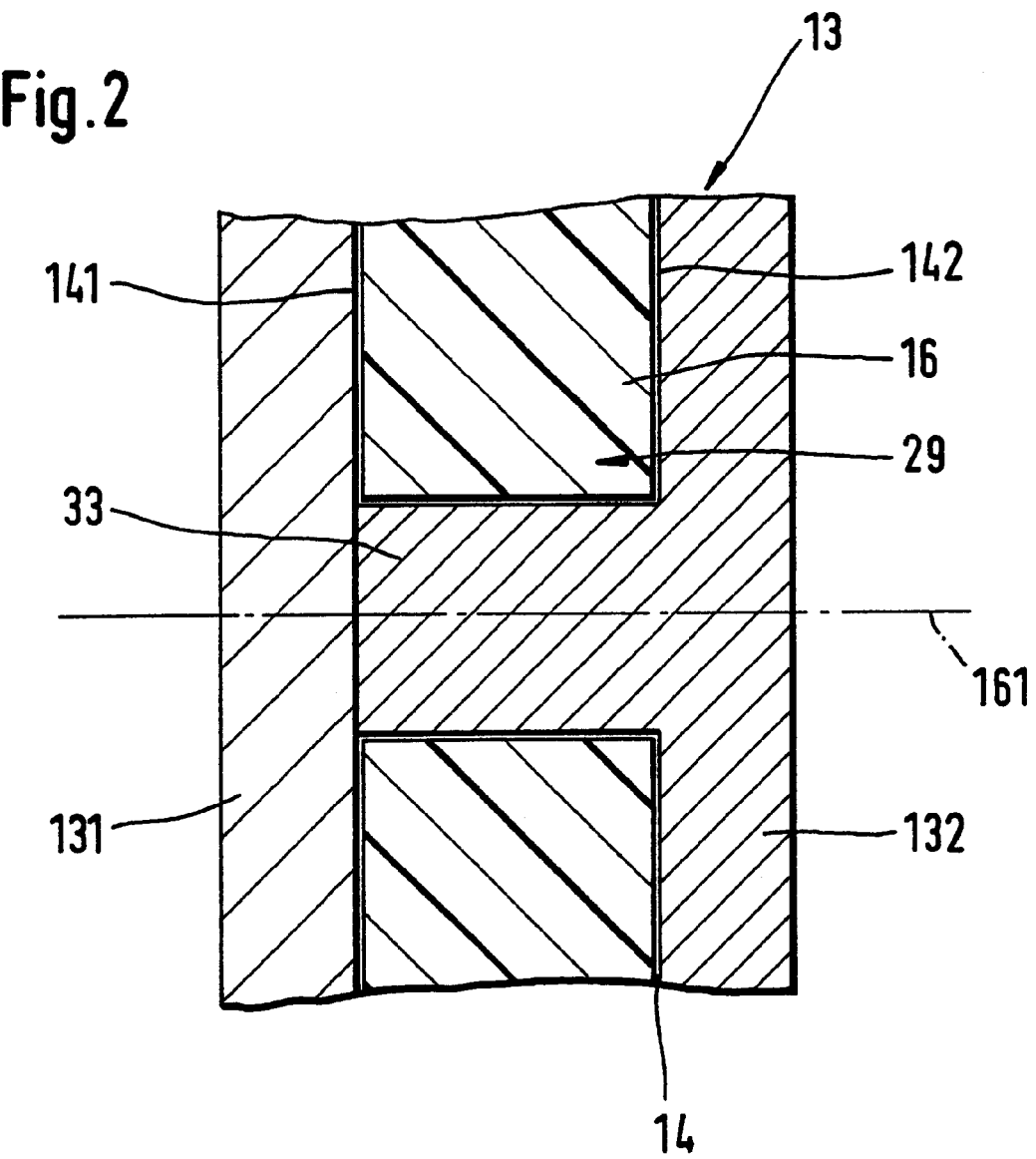
FIG. 2 is a detailed cutaway cross-sectional view through a modification of the fuel delivery unit shown in FIG. 1.

The further exemplary embodiment of the delivery pump, details of which are represented in FIG. 2, has only been modified in respect to the seating of the impeller wheel 16 in the housing 13 and otherwise agrees with the above described exemplary embodiment, so that like components have been identified by the same reference numerals. Here, the lateral walls 141 and 142 of the pump chamber 14 are formed on the one side by a cover 131, which closes off the front of the housing 13, and on the other side by a radial flange 132, which is arranged in the housing 13. A shaft end 33, which projects at right angles into the pump chamber 14, is made of one piece with the housing flange 132, and the impeller wheel 16 is seated on it in a freely rotating manner. Following insertion of the impeller wheel 16, the cover 131 is tightly placed on the housing 13 and is firmly connected with it.

Figure 3:
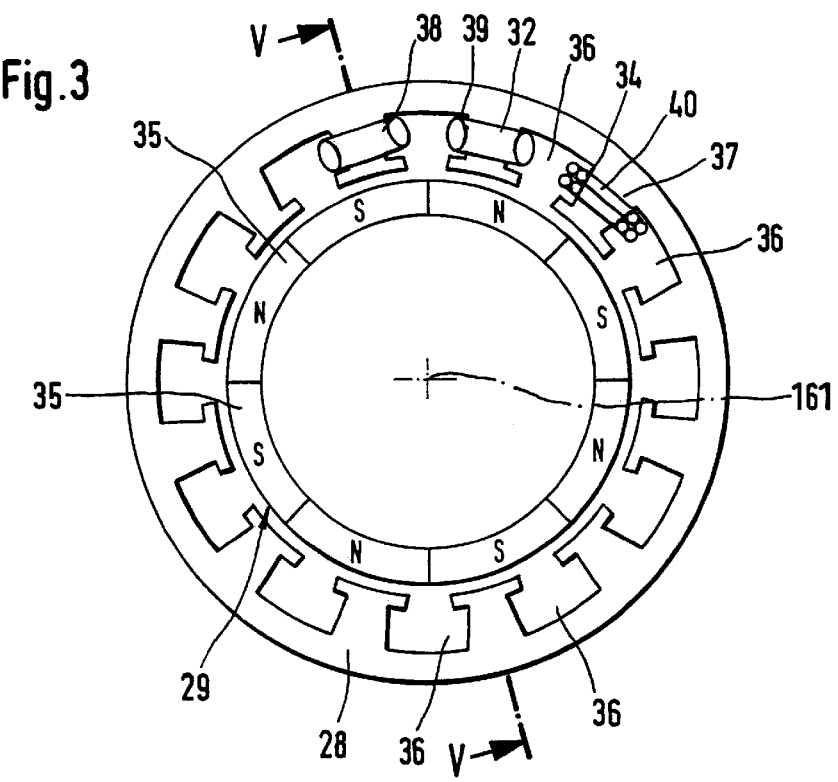
FIG. 3 is a transverse cross-sectional view through a first variation of the fuel delivery unit according to FIG. 1 with the armature winding extending in a circumferential direction.

FIG. 3 shows a first variation, wherein a first coil 34 of the armature winding 32 is arranged around the impeller wheel axis 161 and extends approximately in the circumferential direction. Here, "approximately" means that the first coil 34 can form a quasi-tangent line which, because of a slight inclination, can also intersect an imaginary circle around the impeller wheel axis 161. The inclination is a function of the manufacture of the armature winding 32. The rotor 29, which at the same time is the pump impeller wheel, has permanent magnets 35 on the circumference. Their preferred pole number is 8, as represented, however, it can deviate upward, or respectively downward as a function of the excitation and generation of a torque. The stator 28 again has grooves 36. These are utilized in such a way that a strip 37 located between two grooves 36 is surrounded by the winding 32. The number of strands of the winding 32 preferably is three. As a rule this is enough for generating a sufficient electronic rotary field in the stator 28. As represented, a first strand 38, a second strand 39 and a third strand 40 are advantageously arranged directly next to each other in grooves 36. The strands 38, 39, 40 extend in an alternating manner around the circumference of the stator 28 and constitute the respective wrappings around the strips 37. Only three wrappings of the strips 37 are represented in FIG. 3, one wrapping from each strand 38, 39, 40. Besides such an adjoining arrangement, the strands 38, 39, 40 can also be separated from each other at larger distances by the grooves 36. For this, the number of grooves lies between 12 and 24. It is possible in this way to make a sufficient number of grooves 36 and strips 37 for being able to make a finer division in the generation of the electrical rotating field.

Figure 4:
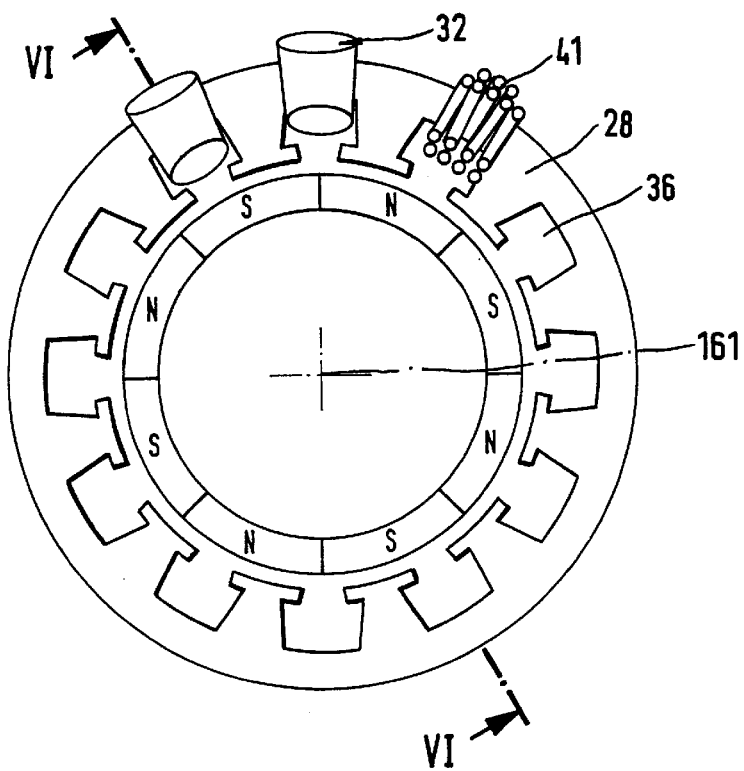
FIG. 4 is a transverse cross-sectional view through a second variation of the fuel delivery unit according to the invention as shown in FIG. 1 with the armature winding extending in a radial direction.

FIG. 4 shows a second variation, wherein a second coil 41 of the armature winding 32 is arranged around the impeller wheel axis 161, extending approximately in the radial direction. Here, "approximately" means that the second coil 41, for example for reasons of production, can also have a slight inclination in the radial direction. The second coil 41 uses a groove 36, wherein it partially extends around the stator 28 in a manner analogous to a toroidal transformer. The remaining structure corresponds to what is already known from FIG. 3.

While the first variation in FIG. 3 requires a broad strip 37 for generating the electrical rotating field, in an arrangement of the second development 41 in accordance with the second alternative in FIG. 4 the width and height of the material of the stator 28 enclosed by the second coil is decisive. It is therefore easily possible for deviations to exist regarding the dimensions of the two alternatives.

Figure 5:
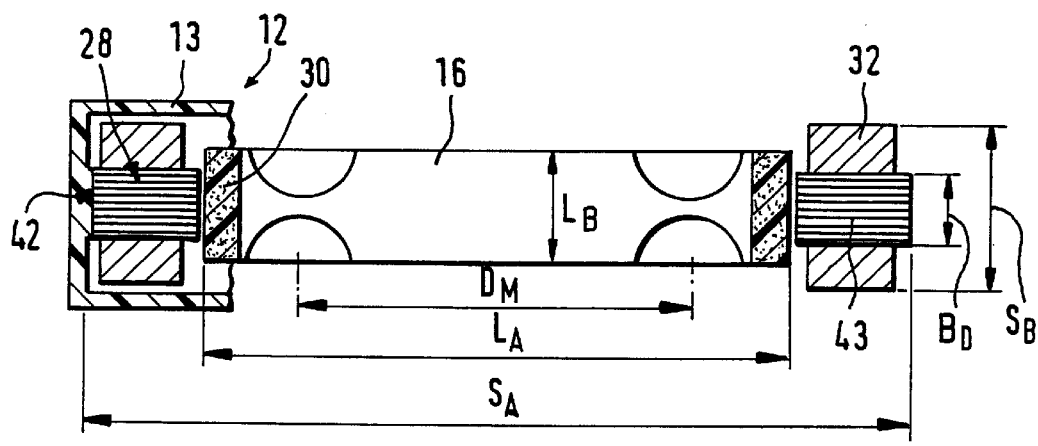
FIG. 5 is a longitudinal cross-sectional view through the embodiment shown in FIG. 3 taken along the section line V—V.
Figure 6:
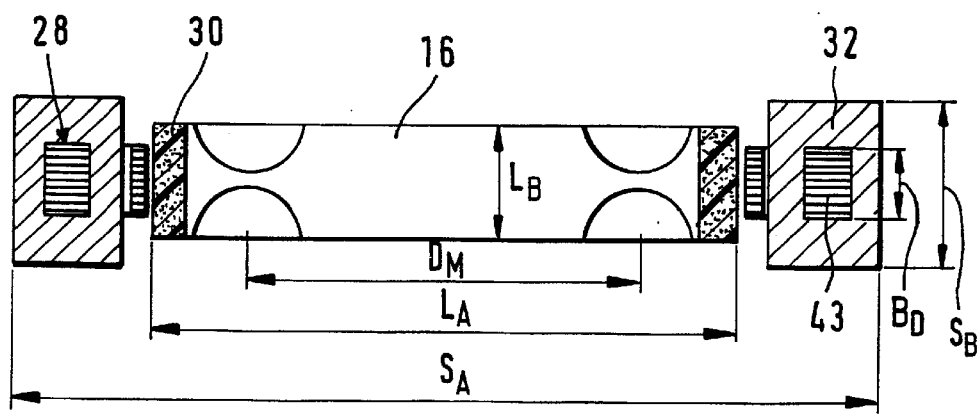
FIG. 6 is a longitudinal cross-sectional view through the embodiment shown in FIG. 4 taken along the section line VI—VI.

FIG. 5 and FIG. 6 respectively represent the two variations from FIG. 3, or respectively FIG. 4, in longitudinal section along the lines V—V, or respectively VI—VI. Similar to FIG. 1, FIG. 5 and FIG. 6 show that the electric motor 12 has been completely integrated into the housing 13. With the side-channel pump embodied in this way in the delivery unit, torque transfer takes place at the outer rotor diameter $L_A$ with the aid of the electric motor 12 in the form of a brushless DC servo motor. For employment as a motor fuel delivery unit and with gasoline delivery preferred, its dimensions can be distinguished by a winding height $S_B$, an armature stampings height $B_D$, an exterior stator diameter $S_A$, an impeller wheel width $L_B$, a diameter in respect to the center of the vane chambers $D_M$, as well as the exterior rotor measurement $L_A$. A preferred embodiment of the stator 28 and the rotor 29 has an increased axial structural length of the stator 28 in respect to the impeller wheel width $L_B$. This means that the winding height $S_B$ is greater than the impeller wheel width $L_B$. This is represented in FIGS. 5 and 6. Because of this, the dimensions of the delivery unit remain compact, wherein torque within a range between 160 Nmm and 40 Nmm in a revolution number range of the rotor 29 of n=4000 to 8000 1/min becomes possible. The diameter $D_M$, which represents the distance between oppositely located centers of vane chambers, advantageously lies in a range of $D_M$=25 to 42 mm. The stator 28 can be made from layers of sheet metal, or also of a single piece, and is advantageously integrated into the housing 13 via a suitable connection 42. Because of this, the permanent magnet segments 30 on the impeller wheel 16 can be set to the desired position in relation to the stator 28 in the course of assembling the delivery unit.

Figure 7:
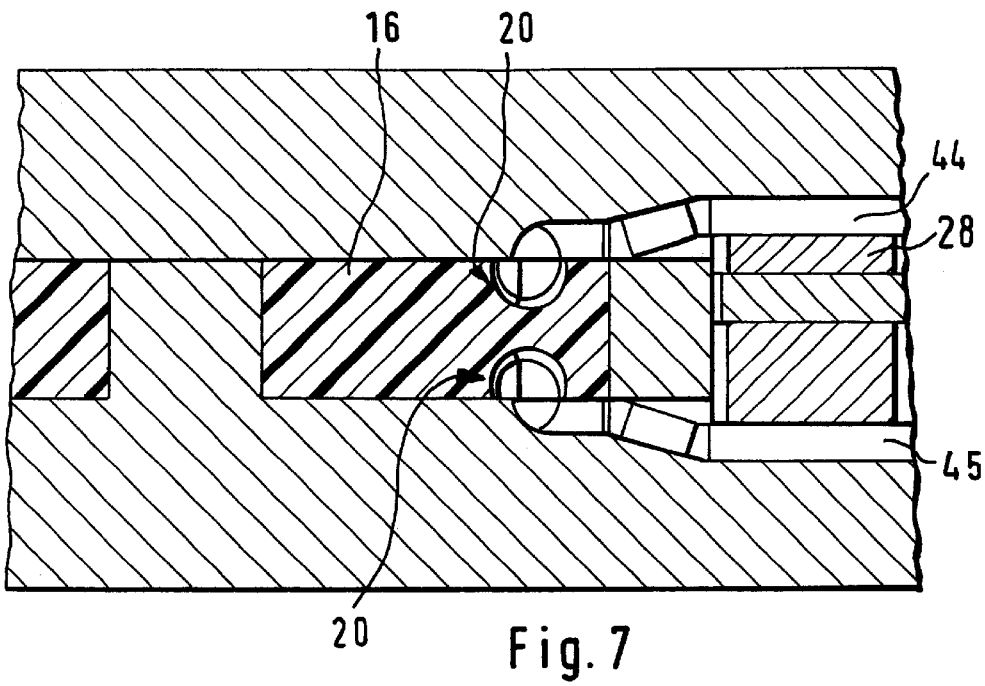
FIG. 7 is a cutaway longitudinal cross-sectional view through a fuel delivery unit according to the invention showing the structural features for providing radial inflow and outflow of the fluid pumped by the fuel delivery unit.

FIG. 7 represents an embodiment of the delivery unit with radial inflow and outflow. The impeller wheel 16 with its radial impeller wheel vanes 20 receives the fluid via a first, 44, and a second inflow channel 45. In the embodiment represented, they are guided around the stator 28, so that the fluid flowing into the impeller wheel vanes 20 has a radial as well as an axial flow component.

Figure 8:
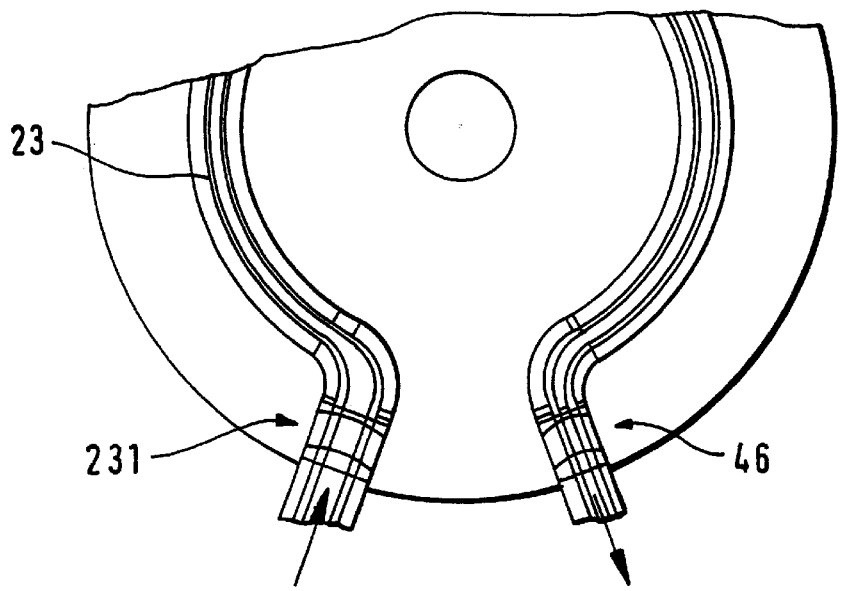
FIG. 8 is a transverse axial cross-sectional view through another embodiment of the fuel delivery unit according to the invention showing details of the inflow and outflow.

FIG. 8 represents a further design of an inflow into the side channel 23. The fluid, indicated by arrows, has a purely radial direction in the area of the side-channel start 231, as well as in the area of the side-channel outlet 46. This has the particular advantage of a low-loss inflow and outflow from the side channel 23. The realization of this inflow and outflow principle will be explained in the following drawings in greater detail by means of the first and second variations from FIGS. 3 and 4.

Figure 9:
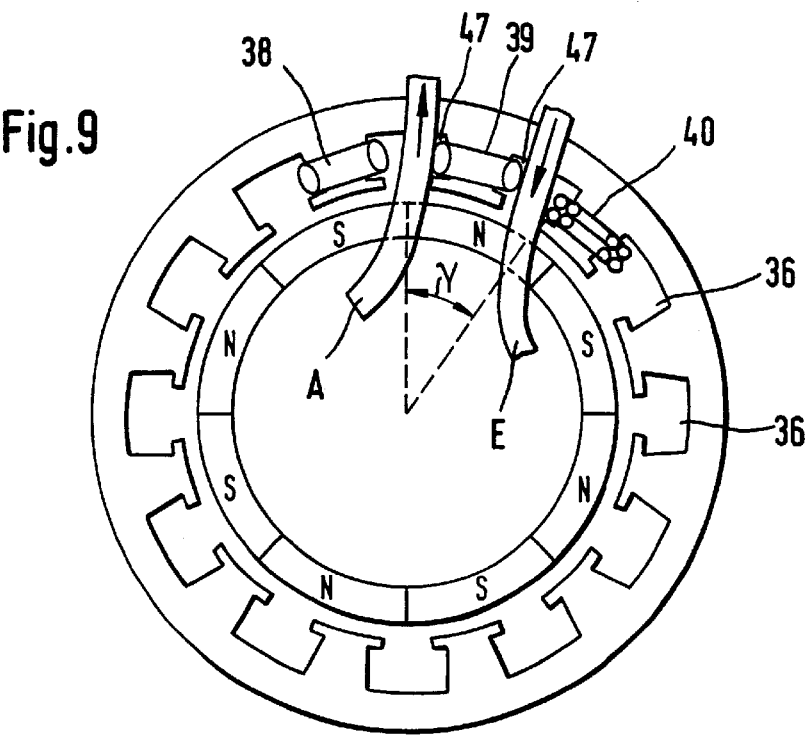
FIG. 9 is a transverse axial cross-sectional view through an embodiment of a fuel delivery unit in accordance with FIG. 3.
Figure 10:
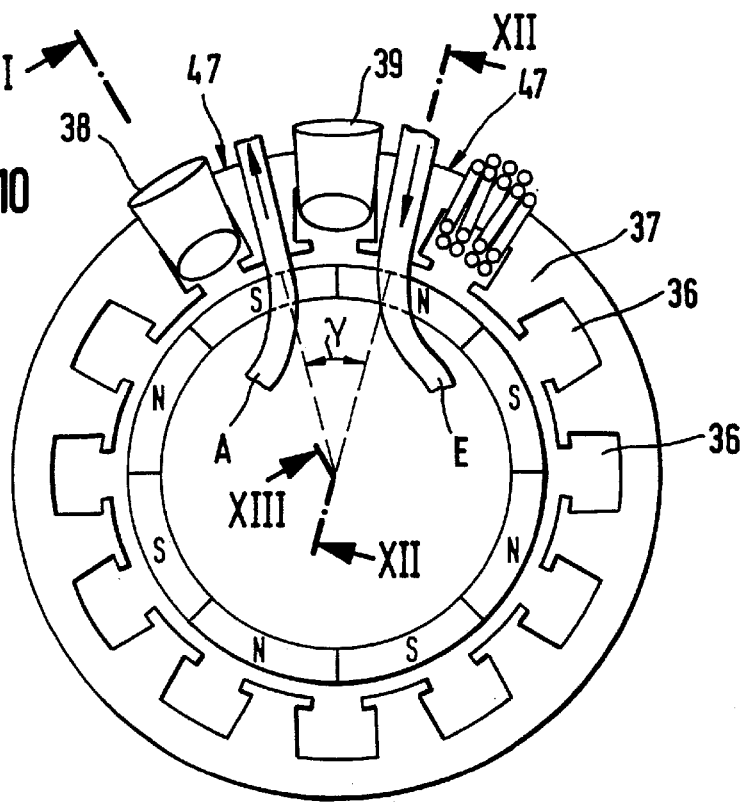
FIG. 10 is a transverse axial cross-sectional view through an embodiment of a fuel delivery unit in accordance with FIG. 4.

FIG. 9 and FIG. 10 show advantageous designs of embodiments of the delivery units in accordance with FIG. 3 and FIG. 4, making use of the spaces 47 between the individual strands 38, 39, 40. The first variation, which is realized in FIG. 9, has an inlet E as an inflow channel and an outlet A as an outflow channel for the side channel, not shown in detail, both of which, lying radially above grooves, are arranged to extend radially. In FIG. 10, the inlet E and the outlet A can be conducted over strips 37 of the armature stampings. This makes use of the advantage that, as already represented in FIG. 6, the thickness $B_D$ of the armature stampings is less than the impeller wheel width $L_B$. Furthermore, by varying the number of grooves 36, the required degree of freedom for structurally determining the size of the angle of circumference τ between the outlet A and the inlet E is obtained within certain limits. Therefore both the inlet E and the outlet A need not extend strictly radially, but can also have an inclination in relation to a radial line.

Figure 11:
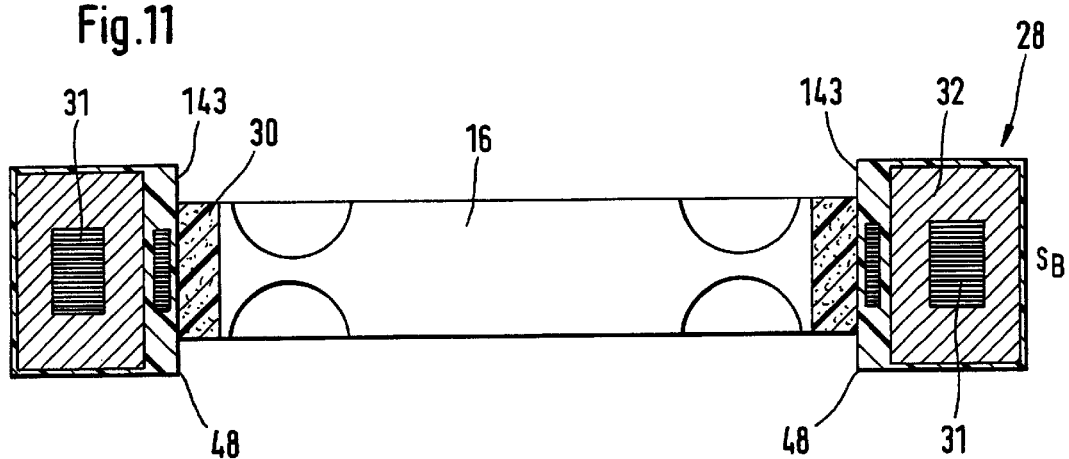
FIG. 11 is a longitudinal cross-sectional view through a stator with a casing.

FIG. 11 shows a further advantageous embodiment, wherein the stator 28 with its armature winding 32 and armature stampings 31 is provided with a casing 48. The casing 48 is a molded or extruded resin, for example, so that the stator is completely compound-filled, or respectively extrusion-coated. By means of this it is possible to achieve a smooth surface of the stator, so that for one leakages are minimized, and on the other hand a great surface smoothness of little roughness can be achieved. In this case the distance between the permanent magnet segments 30 of the impeller wheel 16 and the peripheral wall 143 can be kept short. Because the armature stampings 31 are also encased in the vicinity of the peripheral wall 143, the peripheral wall 143 also has a completely smooth surface in this area. Moreover, the armature stampings 31 are protected, at least in this area, also from the fluid passing through the double-flow side-channel pump.

Figure 12:
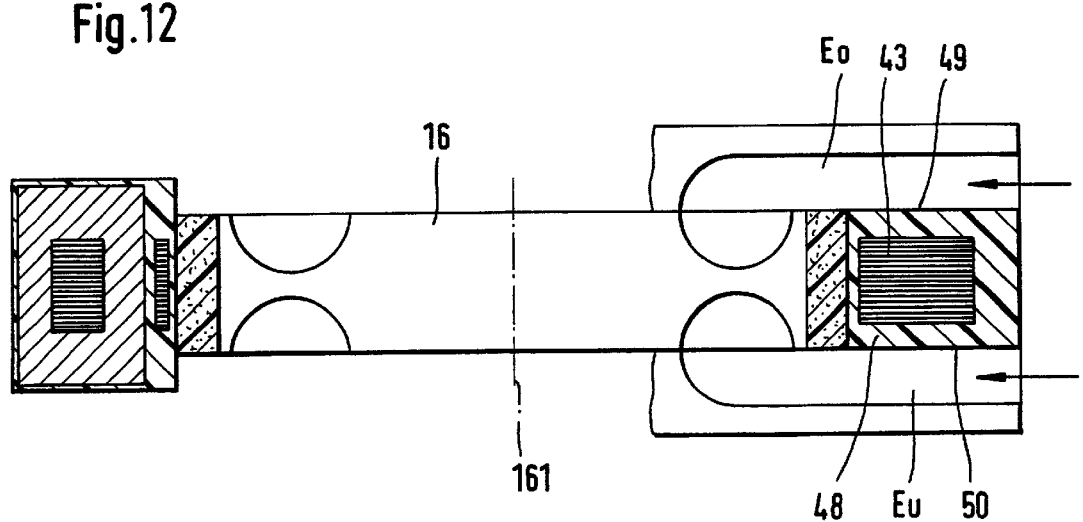
FIG. 12 is a longitudinal cross-sectional view of the stator of FIG. 11 taken along section lines XII—XII and XIII—XIII aas shown in FIG. 10.

FIG. 12 shows the stator of FIG. 11 with a longitudinal section through an inflow in accordance with lines XII to XII and XIII to XIII in FIG. 10. A double-flow inflow into the impeller wheel 16 is realized by an upper inlet $E_O$ and a lower inlet $E_U$ as the inflow channels. The armature stampings 48 have a casing 48, wherein a first surface 49 and a second surface 50 of the casing 48 can be used at the same time as a portion of the upper inlet $E_O$, or respectively the lower inlet $E_U$. Both inlets $E_O$, $E_U$ only extend in the radial direction toward the impeller wheel axis 161. Because of this, swirling losses from an axial flow guidance over the length of the inlets $E_O$, $E_U$ are avoided.

What is claimed is:

1. A delivery unit for delivering motor fuel, said delivery unit comprising a delivery pump (11) and an electric motor (12) for driving the delivery pump (11);

wherein said delivery pump (11) has a housing (13), a pump chamber (14) provided in the housing (13) and an impeller wheel (16) arranged in the pump chamber (14);

wherein said pump chamber (14) is bounded by a peripheral wall (143), said impeller wheel (16) has a radial spacing from said peripheral wall (143) and said impeller wheel (16) has an impeller wheel axis (161);

wherein said electric motor (12) comprises a stator (28), a rotor (29), an armature winding (32) and permanent magnets (30); said stator (28) receives either said armature winding (32) or said permanent magnets (30), and said permanent magnets (30) are arranged on or included in said rotor (29) when said armature winding (32) is provided on said stator (28) or said armature winding (32) is arranged on said rotor (29) when said stator receives said permanent magnets;

wherein the electric motor (12) is brushless, said electric rotor (12) consists of said impeller wheel (16) of the delivery pump (11), said stator (28) has an inner ring face and said inner ring face consists of said peripheral wall (143) of said pump chamber (14).

2. The delivery unit as defined in claim 1, wherein the permanent magnets (30) are arranged on and circumferentially around the impeller wheel (16), the stator (28) supports the armature winding (32), the stator (28) is received in the housing (13) of the delivery pump (11) and the stator (28) is arranged coaxially in relation to the impeller wheel axis (161).

3. The delivery unit as defined in claim 2, wherein the pump chamber (14) is cylindrical, the pump chamber (14) is bounded axially by two radially extending lateral walls (141, 142) spaced axially from each other, said lateral walls have respective circular peripheral edges, the pump chamber is bounded radially by said peripheral wall (143), said peripheral wall (143) connects the lateral walls (141, 142) with each other along said circular peripheral edges, said impeller wheel (16) is arranged in said pump chamber (14) with clearance from said lateral walls (141, 142), and said inner ring face of the stator (28) is formed by riveted armature stampings (31).

4. The delivery unit as defined in claim 3, wherein the impeller wheel (16) has a plurality of radial impeller wheel vanes (20), said wheel vanes are spaced apart from each other in a circumferential direction around the impeller wheel and axially bound open vane chambers (22) between said wheel vanes (20), said wheel vanes (20) are connected with each other by an outer ring (21), and said permanent magnets (30) are fastened on the outer ring (21).

5. The delivery unit as defined in claim 4, wherein the permanent magnets (30) each comprise a plasto-ferrite material.

6. The delivery unit as defined in claim 3, wherein the lateral walls (141,142) are provided with respective groove-like side channels (23, 24), said respective groove-like side channels are open toward the pump chamber (14) and are concentric in relation to the impeller wheel axis (161), said respective groove-like side channels have corresponding side channel starts and side channel ends with interrupter portions between the side channel ends and the side channel starts of the side channels, the side channel start (231, 241) of at least one side channel (23, 24) is connected with an intake opening (27) via an inflow channel (25, 26), and the side channel end is connected with a pressure outlet via an outflow channel (44,45).

7. The delivery unit as defined in claim 6, wherein the inflow and the outflow channels (25, 26, 44, 45) extend radially.

8. The delivery unit as defined in claim 7, wherein the inflow channel (25,26) is an inlet (E), the outflow channel (44,45) is an outlet (A) and respective largest parts of the inlet (E) and the outlet (A) extend radially.

9. The delivery unit as defined in claim 6, wherein the inflow and the outflow channels (25, 26) extend axially.

10. The delivery unit as defined in claim 1, wherein the armature winding (32) includes a first coil (34) arranged extending approximately in a circumferential direction around the impeller wheel axis (161).

11. The delivery unit as defined in claim 1, wherein the armature winding (32) includes a second coil (41) extending approximately in a radial direction around the impeller wheel axis (161).

12. The delivery unit as defined in claim 10 or 11, wherein the armature winding (32) is at least partially arranged in grooves (36) provided in the stator (28).

13. The delivery unit as defined in claim 10 or 11, wherein the stator (28) is compound-filled or extrusion-coated.

14. The delivery unit as defined in claim 10, wherein the inflow and the outflow channels (25, 26) extend over respective grooves (36) provided in the stator (28).

15. The delivery unit as defined in claim 11, wherein the inflow and the outflow channels (25, 26) respectively extend over a strip (37) of the stator (28).

16. The delivery unit as defined in claim 1, wherein the stator (28) has a stator width (SB) that is greater than an impeller wheel width (LB).

* * * * *